July 6, 1965

F. W. ROHE ETAL 3,192,982

BARREL NUT WITH RETAINER SPRING

Filed Oct. 19, 1962

INVENTORS
FREDERICK W. ROHE
CHARLES S. PHELAN
BY
Lynn H. Latta
ATTORNEY

July 6, 1965   F. W. ROHE ETAL   3,192,982
BARREL NUT WITH RETAINER SPRING
Filed Oct. 19, 1962                               2 Sheets-Sheet 2

INVENTOR.
FREDERICK W. ROHE
CHARLES S. PHELAN
BY

ATTORNEY

United States Patent Office 3,192,982
Patented July 6, 1965

3,192,982
BARREL NUT WITH RETAINER SPRING
Frederick W. Rohe, 5191 S. Bradford, Placentia, Calif., and Charles S. Phelan, Tustin, Calif.; said Phelan assignor to said Rohe
Filed Oct. 19, 1962, Ser. No. 231,758
2 Claims. (Cl. 151—41.75)

This invention relates to barrel nuts, and has as its general object to provide an improved combination of barrel nut and retainer spring for positioning the nut in a transverse mounting bore to receive a bolt inserted through a bolt hole intersecting the mounting bore at right angles.

Another object of the invention is to provide improvements in an assembly of barrel nut and retainer spring for yieldingly positioning the barrel within a mounting bore pending insertion of a bolt through the nut. The invention aims to provide a retainer spring of simplified construction and reduced cost as compared to conventional retainer springs. A further object is to provide a retainer spring having a connection of improved security between the spring and the barrel nut. A still further object is to provide a barrel nut and a retainer spring assembly wherein the portion of the spring that attaches it to the nut has maximum clearance with respect to the wall of the mounting bore to avoid interference. A still further object is to provide a barrel nut retainer spring assembly embodying an improved high-strength combination of nut base and retainer saddle wherein the nut base is adapted to have direct bearing contact with the wall of the mounting bore to supplement the support provided by the saddle, in combination with a spring having an attachment to the nut which is free of any overhanging connection with the nut base, so as to avoid interference with the seating connection between the nut base and the mounting bore.

A still further object is to provide an improved barrel nut and retainer spring assembly wherein the retainer spring embodies an extension tip providing a pilot for locating in an extension of the bolt hole of the mounting body, for automatic location of the barrel nut assembly in the mounting bore.

The invention is especially applicable to barrel nuts of the type wherein a separate nut is seated loosely in a retainer cradle which in turn is mounted within the transverse mounting bore, free for limited rotational and axial shifting movements to accommodate the position of the nut to the bolt that is inserted therein. A specific object of the invention is to provide a retainer spring with end portions having the dual function of attaching the retainer spring to the cradle and retaining the nut in assembled relation to the cradle.

Other objects and advantages will become apparent in the ensuing specification and appended drawings in which.

General Description

Figure 1:
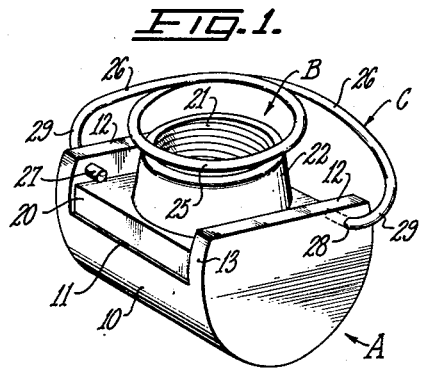
FIG. 1 is a perspective view of a barrel nut assembly embodying the invention in one form.
Figure 2:
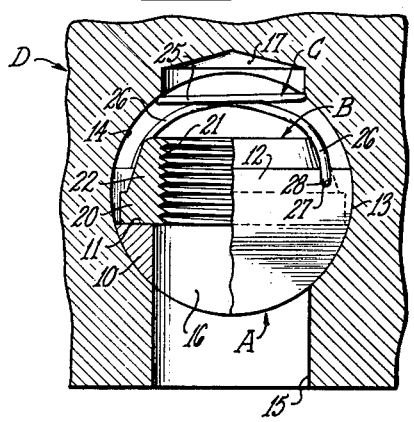
FIG. 2 is a transverse sectional view of a mounting body with my improved barrel nut and retainer spring assembled therein.
Figure 3:
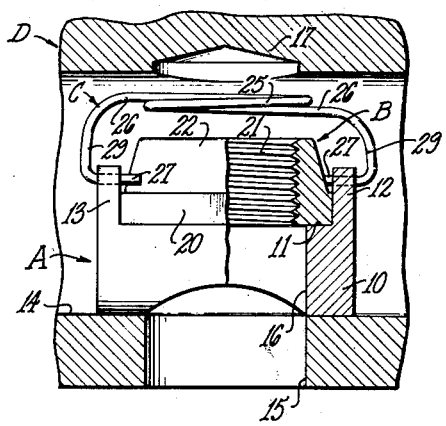
FIG. 3 is a sectional view of the same in the plane of the axis of the mounting bore but with portions of the nut and cradle shown in elevation.

Referring now to the drawings in detail, and in particular to FIGS. 1–3, I have shown therein, as an example of one form in which the invention may be embodied, a barrel nut and retainer spring assembly comprising, in general, a retainer cradle A, a nut B seated in the cradle A for limited self-aligning movements, and a retainer spring C holding the nut and retainer in position in a mounting body D (FIG. 2) during the insertion of a bolt through a bolt hole in the body D.

Figure 4:
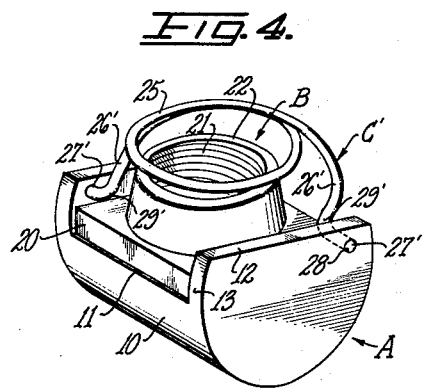
FIG. 4 is a perspective view of an assembly of barrel nut and retainer spring embodying a modified form of my invention.
Figure 5:
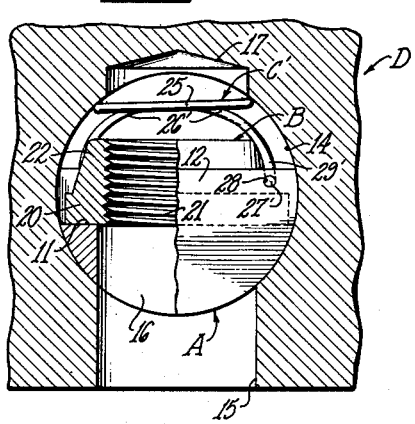
FIG. 5 is a transverse sectional view of an assembly of mounting body and the modified barrel nut, with a portion of nut and cradle shown in end elevation.
Figure 6:
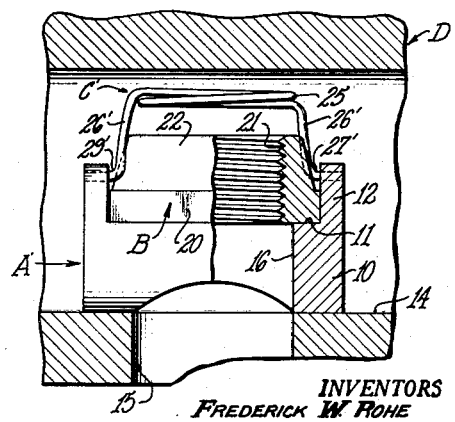
FIG. 6 is a sectional view of the assembly of mounting body and barrel nut along the axis of the mounting bore, with portions of the cradle and nut shown in side elevation.

The modified form of the invention shown in FIGS. 4–6 embodies the same combination of parts with the exception that the retainer spring is modified and is indicated generally at C'.

Detailed description—FIGS. 1–3

Cradle A comprises a segmental cylindrical body including a bridge portion 10 having a segmental cylindrical wall of less than 180° circumferential extent and having a flat chordal wall 11 functioning as a nut seat. Integral retainer lips 12 project radially from the respective ends of bridge portion 10 across the axial plane parallel to the nut seat 11, the lips 12 having respective side faces 13 which may constitute continuations of the segmental cylindrical lateral surface of bridge 10 and may combine therewith to provide a composite bearing surface of greater than 180° extent, for bearing engagement with the interior cylindrical wall of a mounting bore 14 in the mounting body D, in which the barrel nut assembly is adapted to be installed. A bolt hole 15 communicates with the bore 14 with its longitudinal axis intersecting the axis of the bore 14 at right angles thereto. A bolt hole 16 in the bridge 10 intersects the seat 11 thereof, at right angles thereto, in the center thereof, and is adapted to be aligned with the bolt hole 15.

Nut B comprises a rectangular base 20 having opposite ends loosely fitted to the flat vertical inner faces of lips 12 with just sufficient clearance to leave the nut B free for movements into alignment with the bolt opening 16, and engageable with the lips 11 so the retainer cradle A will hold the nut B against rotation. The nut B has an internal thread 21 which extends through the base 20 and through an integral tubular nut body 22 projecting at right angles from the base 20.

Spring C comprises a central coil or loop 25, and spring base means comprising a pair of arms 26 projecting tangentially from respective extremities of the coil 25, and a pair of straight tips 27 which project through bores 28 in diagonally opposite corners of the retainer lips 11. The tips 27 are connected to the respective arms 26 by return bends 29 so as to project inwardly toward the nut B, whereas the arms 26 project outwardly away from the nut B. Bends 29 are slanted downwardly from the plane of coil 25 to the plane of bores 28.

The tips 27 are of sufficient length to project beyond the inner faces of retainer lips 11, over the diagonally opposite corners of the nut base 20, so as to retain the nut in assembly with the cradle A. As best shown in FIG. 3, the tips 27 project into obstructing relation to the tubular nut body 22, so as to prevent the nut B from becoming detached from the cradle A by sliding movement on its seat 11 between the retainer lips 12. In projecting over the corners of base 20, the tips 27 prevent the nut B from becoming detached from cradle A by movement bodily away from the seat 11 (along the bolt axis).

Referring now to FIG. 2, the central coil 25 is positioned to bear yieldingly against the wall of mounting bore 13 diametrically opposite from the bolt hole 15, thus yieldingly loading the retainer cradle A in seating relation to the wall of bore 14 around the bolt hole 15, with sufficient frictional engagement to hold the retainer cradle A in any position to which it is adjusted in the bore 14. Thus, the retainer cradle A will be temporarily held against rotational or axially sliding displacement from the selected position.

It may now be noted that the spring arms 26 extend in a direction generally parallel to the major axis of cradle A and thus will extend generally longitudinally within the bore 14 in the installation within mounting body D. As shown in FIG. 2, the arms 26 and return bends 29 are spaced laterally inwardly from the respective sides of the wall of bore 14 so as to avoid interference.

Modified form—FIGS. 4–6

In the modified form of the invention shown in FIGS. 4–6, the arms 26' of the spring C' are shortened and are connected by bends 29' extending downwardly under the lips 12, to retainer tips 27' which extend outwardly into bores 28 in the diagonally opposite corners of retainer lips 12. This form of the invention is particularly useful in application where there is limited space between nut B and the wall of bore 14.

In the form of the invention shown in FIGS. 4–6, the spring arms 29' extending diagonally inwardly from the coil 25 toward the nut seat 11, are positioned in obstructing relation to the respective sides of the tubular nut body 22 so as to limit transverse sliding movement of the nut upon the seat 11. This obstructing relation is illustrated in FIG. 6. Actual contact between the nut body 22 and the arms 26' may occur approximately at the bends 29'.

In the modified form, the nut base 20 is confined by the portions of spring tips 27 where they join the connecting bends 29'.

With the exception of the differences described above, the assembly disclosed in FIGS. 4–6 is the same as that disclosed in FIGS. 1–3.

In each form of the invention in FIGS. 1–6, the bores 28 are parallel to side margins of the flat seat 11 and are substantially spaced laterally from the median normal plane thereof (the plane of the axis of the bolt opening 16). Thus the axes of the bores 28 diverge essentially from a diagonal line extending between the two bores 28, and consequently the bores 28 do not have a common axis around which the spring C would tilt. Accordingly, the engagement of the spring tips 27 in the bores 28 is such as to position the spring with its loops 25 in coaxial opposed relation to the bolt opening 16, and when the loop 25 is compressively engaged against the opposite wall of the bore 14 after the assembly of barrel nut and spring has been inserted into the bore, it will effectively hold the barrel nut assembly in a position aligning its bolt opening 16 with the bolt hole 15, which position may be obtained by adjustment after the insertion of the assembly in the bore.

Preferably, coil 25 is of larger diameter than the thread 21 so that a bolt of extra length can be threaded entirely through the nut and into an extension 17 of the bolt hole 15, passing through the loop 25.

Modified forms—FIGS. 7–13

Figure 7:
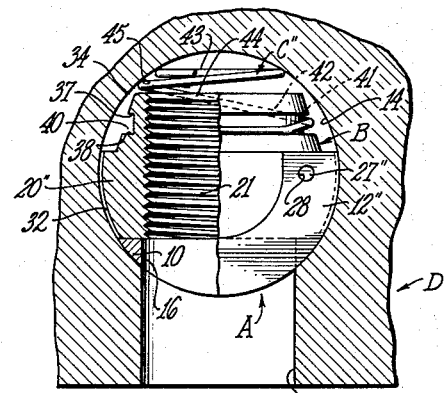
FIG. 7 is a transverse sectional view of retainer spring and assembly of barrel nut and retainer saddle, within a mounting bore, embodying another modified form of the invention.

FIGS. 7–13 illustrate an improved combination of retainer spring C″ with a barrel nut assembly similar to that described above. The retainer spring comprises a circular base coil or loop 40 caged in a retainer groove 37 encircling nut body 34 and having end bearing engagement with a shoulder 38 defining one side of groove 37; a helix 41 of reduced diameter connected to the base loop 40 by a steeply rising portion 42 of approximately 180° circumferential extent; and an end coil 43 of further reduced diameter for yielding compressive engagement against the wall of bore 15. The diameters of the coil 43 and of the helical turn 41 may be such that these parts just clear the side of the bore 14 where they converge to the crown area of the bore 14 on the bolt axis, as indicated in FIG. 7. Where the bolt hole has an extension in this crown area of bore 14, the end coil 43 may be slightly larger than the thread diameter of the bolt to permit the bolt to pass through.

The steeply rising half turn 42 of the helix 41 leaves the base ring 40 before it reaches a point in the transverse plane of the bolt axis, and it clears the outer end of the nut body 34 at a point (e.g. indicated at 44 in FIG. 7) near the common plane of the bolt axis and major bore axis or between that point and a point in the transverse plane at the opposite side of the nut (e.g. indicated at 45 in FIG. 7). At this lateral point, the helix 41 lies closely between the end of the nut body 34 and the adjacent wall of the bore 14. Where it clears the end of the nut, at 44, the helix 41 is accommodated in the unobstructed end area of the bore, spaced well inwardly from the bore wall so as to avoid any interference between the helix and the restricted gap between the bore wall 15 and the tip of the nut at the closest point. Thus it is possible for the tip of the nut to approach the bore wall to substantial contact therewith at opposite sides.

Spring C″ is retained by the base loop 40 in coaxial assembly with nut B, so that in adjusting the nut assembly within the bore 14, the end coil 43 will be shifted by sliding against the bore wall, while maintaining its coaxial relation to the nut. The spring C″ has a free length somewhat longer than the length to which it is compressed when the nut assembly is inserted into the bore and thus it functions to maintain a constant spring load between the nut and the wall of the bore, maintaining the nut assembly in any position to which it is adjusted within the bore 14. Thus it is possible to insert the nut assembly into the bore, to adjust it to a position of approximate coaxial relation between the internal thread 21 and the bolt hole 15, and then insert the bolt, which will exert a self-aligning action upon the assembly as it enters the threaded bore 21. In the meantime the nut will hold the position to which it has been adjusted, until the bolt is inserted.

In this form of the invention, retainer pins 27″ are in the form of separate studs mounted in the bores 28 and projecting into recesses 31 in opposite sides of nut base 20″, retainer lips 12″ are of arcuate bifurcated form as shown, and nut base 20″ has segmental cylindrical side walls in slightly spaced conforming relation to the adjacent areas of the wall of bore 14.

Figure 10:
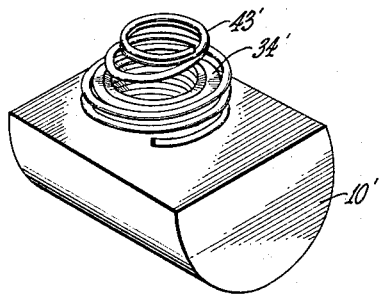
FIG. 10 is a perspective view of a barrel nut and spring assembly embodying another modified form of the invention.
Figure 11:
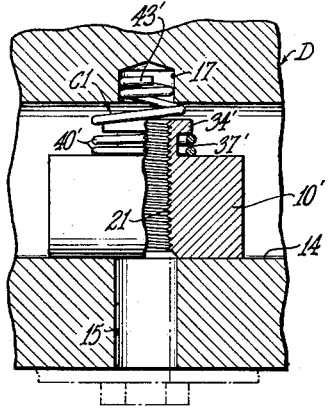
FIG. 11 is a sectional view of the assembly of barrel nut of FIG. 10 in a bore of a mounting body, taken along the axis of the mounting bore but with a portion of the barrel nut and retainer spring shown in side elevation.
Figure 12:
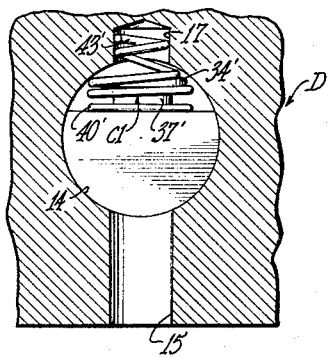
FIG. 12 is a transverse sectional view of the same with the barrel nut and spring shown in end elevation.

FIGS. 10–12 illustrate a modified form of the retainer spring improvement as applied to a one piece barrel nut having a segmental cylindrical barrel portion 10' and a tubular nut body 34' receivable with a piloting action in the extension 17 of the bolt hole 15 in the mounting body D. When the tip 43' is thus piloted in the bolt hole extension 17, the nut body 10' will be automatically positioned with its threaded bore 21 in alignment with the bolt hole 16 of mounting body D.

Figure 8:
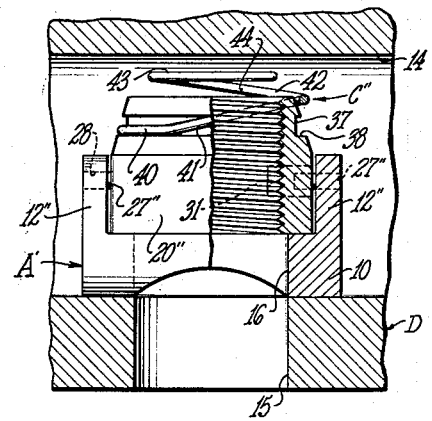
FIG. 8 is a sectional view of a modified form of the assembly shown in FIG. 7 taken along the major axis of the mounting bore, with portions of the cradle and nut shown in side elevation.
Figure 9:
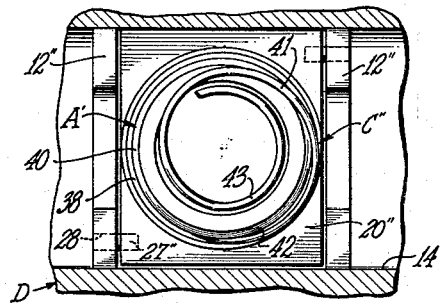
FIG. 9 is a sectional view of the same assembly with the cradle, nut and spring shown in plan view.
Figure 13:
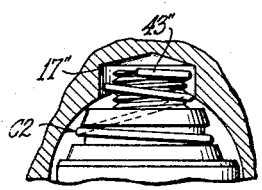
FIG. 13 is a fragmentary segmental view of a cradle, nut and spring assembly in a mounting bore, embodying a further modified form of the invention.

FIG. 13 discloses a further modified form of the invention wherein a pilot tip 43″ is formed on a spring C2 which is otherwise the same as the spring C" of FIGS. 7-9.

We claim:
1. In a barrel nut assembly for installation in a body having a mounting bore and a bolt hole intersecting said bore at right angles, in combination: a retainer cradle including a bridge having a segmental-cylindrical bearing wall for mating engagement with the wall of said bore, a chordal nut seat, and a pair of lips projecting radially from the ends thereof, said lips having in their diagonally opposite extremities, respective retainer bores extending parallel to the sides of said bridge; a nut including a non-circular base supported on said seat and engaged between said lips so as to be held against rotation, and a nut body projecting from said base radially with reference to said bearing wall, said nut body having an internal bolt thread; and a retainer of spring wire including a central coil adapted to yieldingly bear against said body in an area concentric with said bolt hole and diametrically opposite said cradle, a pair of arms extending from said coil longitudinally of said cradle to diagonally opposite corners thereof, a pair of return bends at the outer ends of said arms, and a pair of retainer tips constituting continuations of said return bends, extending inwardly from the remote end faces of said cradle through said bores and thereby attaching said spring to said cradle, and terminating in retainer portions projecting inwardly above the respective corners of said nut face; the shortest distance from the ends of said retainer tips to the opposite lips being less than the shortest distance from the respective portions of the nut body adjacent the respective retainer tips to said opposite lips.

2. In a barrel nut assembly for installation in a body having a mounting bore and a bolt hole intersecting said bore at right angles, in combination: a retainer cradle including a bridge having a segmental-cylindrical bearing wall for mating engagement with the wall of said bore, a chordal nut seat, and a pair of lips projecting radially from the ends thereof, said lips having in their diagonally opposite extremities, respective retainer bores extending parallel to the sides of said bridge; a nut including a non-circular base supported on said seat and engaged between said lips so as to be held against rotation, and a nut body projecting from said base radially with reference to said bearing wall, said nut body having an internal bolt thread; and a retainer of spring wire including a central coil adapted to yieldingly bear against said body in an area concentric with said bolt hole and diametrically opposite said cradle, a pair of arms extending from said coil longitudinally of said cradle to diagonally opposite corners thereof, a pair of integral bends on the outer ends of said arms, and a pair of retainer tips integral with and projecting from said bends away from one another outwardly from the inner faces of said retainer lips through said bores and thereby attaching said spring to said cradle, and terminating near the outer end faces of said cradle, said bends being disposed between said tips and said nut body, said central coil being of a larger diameter than said bolt thread so as to permit passage of a bolt therethrough, said arms extending diagonally from the plane of said nut base toward the end of said nut body and spirally inwardly toward the axis of said nut thread, and being tangent to said central coil and in obstructing relation to a respective side of said nut body to limit transverse movement of said nut upon said seat between said retainer tips, the shortest distance from the spring arms to the opposite lips being less than the shortest distance from those portions of the nut body adjacent the respective spring arms to said opposite lips.

References Cited by the Examiner
UNITED STATES PATENTS

| | | | |
|---|---|---|---|
| 2,345,650 | 4/44 | Attwood | 85—32 |
| 2,767,951 | 10/56 | Cousino | 151—41.75 |
| 2,903,035 | 9/59 | Davenport et al. | 151—41.75 |
| 3,005,292 | 10/61 | Reiland | 151—41.75 |

EDWARD C. ALLEN, *Primary Examiner.*